United States Patent [19]

Davis, Jr.

[11] 4,057,735

[45] Nov. 8, 1977

[54] CHRISTMAS TREE LIGHTING CONTROL

[76] Inventor: George B. Davis, Jr., 7512 Marbury Road, Bethesda, Md. 20034

[21] Appl. No.: 637,025

[22] Filed: Dec. 2, 1975

Related U.S. Application Data

[63] Continuation-in-part of Ser. No. 542,803, Jan. 21, 1975, Pat. No. 3,946,244.

[51] Int. Cl.[2] .......... H02J 3/00

[52] U.S. Cl. .......... 307/11; 307/31; 307/38; 315/185 S

[58] Field of Search .......... 307/11, 133, 106; 315/185 S, 200 A, 317; 323/34, 94

[56] References Cited

U.S. PATENT DOCUMENTS

| | | | |
|---|---|---|---|
| 3,421,049 | 1/1969 | Logan | 315/317 |
| 3,496,451 | 2/1970 | Duncan | 323/34 |
| 3,793,531 | 2/1974 | Ferrigno | 307/41 |
| 3,944,878 | 3/1976 | Gerontakis | 315/185 S |

*Primary Examiner*—Robert K. Schaefer
*Assistant Examiner*—Eugene S. Indyk

[57] ABSTRACT

This invention relates generally to ornamental lighting controls and particularly to a lighting control for Christmas tree lighting having preferably at least four duty cycle outputs and wherein the duty cycle patern of each output differs, with respect to a predetermined time interval, from the duty cycle patern of each of the other outputs of the control thereby to produce, in a plurality of ornamental lighting strings respectively connected to the outputs of the control, a coordinated condition of continuously changing light intensities between strings and that occur in predetermined sequential time differing order to result in an overall lighting effect totally unobtainable by any other form of light controlling apparatus.

9 Claims, 5 Drawing Figures

FIG. 1
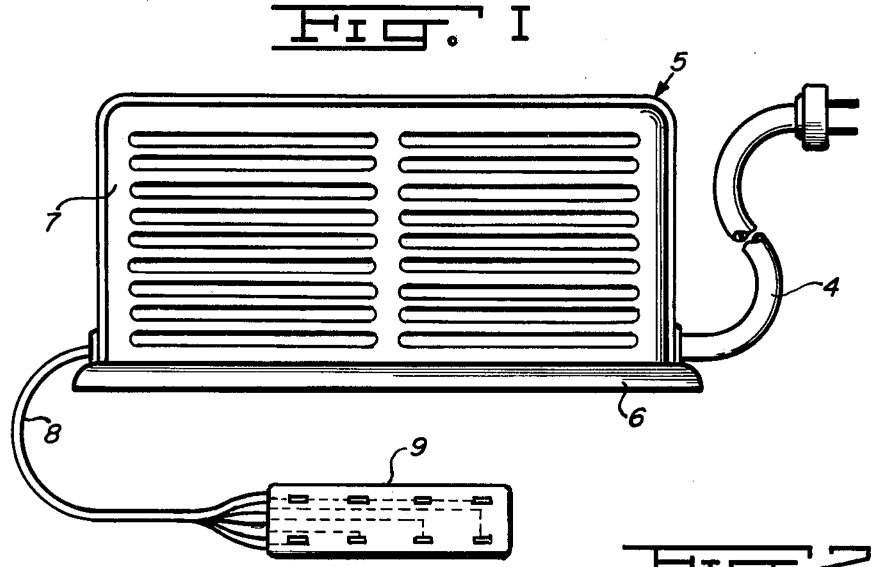
FIG. 2
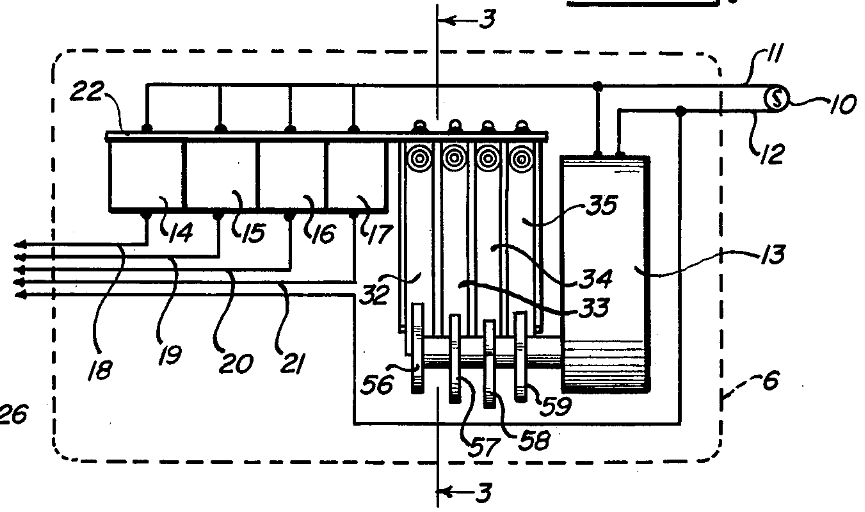
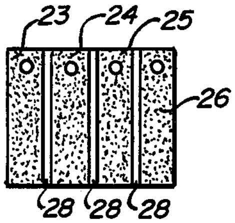
FIG. 4
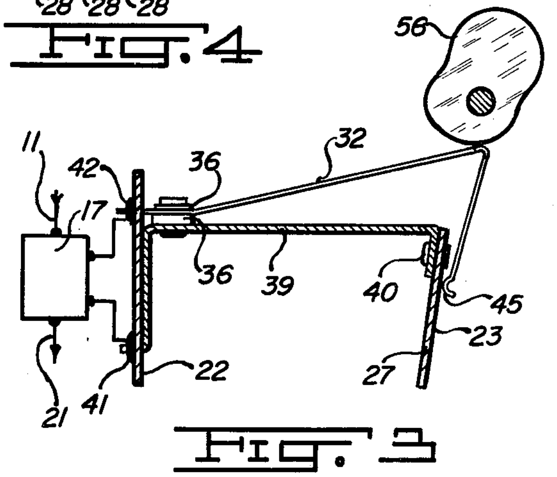
FIG. 3
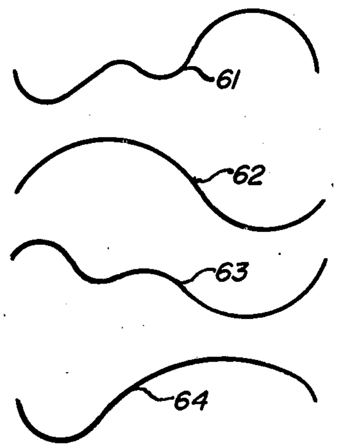
FIG. 5

CHRISTMAS TREE LIGHTING CONTROL

This application is a continuation in part of now pending application Ser. No. 542,803 filed Jan. 21, 1975 now U.S. Pat. No. 3,946,244.

This invention relates generally to ornamental lighting controls and more specifically to such a control wherein a plurality of lighting strings, such as upon a Christmas tree, are caused to vary individually in light output intensity and in predetermined time differing coordinated sequence to effect an overall light intensity output from the tree that remains substantially constant during such light intensity changes to produce a soft, pleasing, shimmering of all the tree lights, restful to observe and highly in contrast to the annoying effect produced by the conventional flasher or by individually controlled lighting strings that invariably reach a state of synchronization to produce a similar type "tree on" "tree off" condition.

It is an object of the present invention to provide a decorative lighting control that includes a plurality of duty cycle units having respectively variable duty cycle outputs to which may be respectively connected strings of ornamental lights, the control being operative to effect continuous coordinating changes in the duty cycle output of each of the duty cycle units with the duty cycle output of each unit varying, with respect to a predetermined time interval, from the duty cycle output patern of each of the other units of the control to produce, in respectively connected lighting strings, a coordination of lighting effects unobtainable by any other form of light controlling apparatus.

A further object is to provide a lighting control that includes a plurality of solid state duty cycle units with the duty cycle output of each unit being variable with respect to each other by means of commonly driven and preferably variously configerated cams that operate to control simultaniously but in differing order the resistance value of variable resistors respectively connected within the gaiting or triggering circuit of each of the duty cycle units with the duty cycle output patern of each unit being predetermined by the selected configeration or positioning of its resistor controlling cam.

A still further object is to provide an ornamental lighting control primarily for Christmas tree lighting that includes a plurality of solid state duty cycle units with each unit having a variable duty cycle output and with the duty cycle output of each unit so programmed with respect to the duty cycle output of each of the other units of the control as to effect, with respect to a predetermined time interval, differing output paterns between units and that, as applied to respectively connected Christmas tree lighting strings, a condition of continuously changing light output intensities that are overlapping in nature and serves to maintain a substantially uniform overall lighting level throughout the tree that appears to an observer as a restful shimmering of all the tree lights.

A still further object is to provide an ornamental lighting control that is rugged in structure, reliable and simple in operation, inexpensive to manufacture yet capable of handling high current loads.

Other objects and advantages will become apparent when referring to the accompanying description and drawings wherein:

FIG. 1 is a plan view in elevation of the assembled lighting control.

FIG. 2 is a plan view partly in elevation and partly in schematic of the device of the invention as contained within the device of FIG. 1.

FIG. 3 is a cross sectional view taken along section 3—3 of FIG. 2 and showing the relation of the cam driven wiper arm of the control to its respective gaiting circuit resistor element electrically connected within its respective duty cycle unit.

FIG. 4 is a plan view of the resistor board and showing the arrangement of the four resistor elements thereon.

FIG. 5 suggest the differing configeration of the light output paterns resulting from one cycle of operation of the different configerated cams upon the gaiting circuit resistors of the respective duty cycle units.

Referring now to the drawings and more particularly FIG. 1 thereof wherein is shown the assembled device of the present invention as will be generally designated 5 and to which may be connected strings of Christmas tree lights with the lights being either of the parallel or series wired types. The assembly 5 includes a mounting base 6 to which the perforated cover 7 is attached and wherein is inclosed the working mechanism of the device. The connector and power supply cord 4 provides means for electrically connecting the device to a conventional 110 volt AC power supply source.

As shown extending from the opposite end of the cover 7 is a multiple strand conductor 8 to which is molded a multiple connector 9 into which in use, strings of ornimental or Christmas lights may be plugged. This conductor 8 may be of any length desired, preferably sufficiently long, as in the case of Christmas tree lighting, to extend well up into the tree for easy access to the lighting strings while allowing the control to rest beneath the tree or possibly some convenient distance away.

With the cover 7 removed, the arrangement of the components of the control are shown to advantage in FIG. 2 wherein is displayed in schematic, the circuitry of the device. Current from the AC source 10 is shown as being supplied by the conductor means 11 and 12 to the motor 13 and solid state duty cycle units 14, 15, 16, and 17 of the control. From each of the duty cycle units extend these respective variable duty cycle output leads 18, 19, 20, and 21 to connect, along with the AC supply conductor 12, FIG. 1, with the terminals of the connector 9 as shown and into which may be plugged in service, the various lighting strings to be controlled.

These duty cycle units 14, 15, 16, and 17 are herein shown in schematic block for the reason that such solid state duty cycle units are well known in the electronic art and may be variously constructed to generally include a SCR or DIAC and TRIAC combination or similar such electronic components. The requirement being with the present device is that each duty cycle unit shall include a resistor controlled gaiting or triggering circuit and wherein the resistance value of the gaiting circuit resistor determines the duty cycle output of the unit.

The duty cycle units are shown as mounted upon a conventionally constructed circuit board 22 that serves to respectively connect to within the gaiting circuits of each of the units, the respective controlling or gaiting circuit resistors which, in the present device is shown in FIG. 4 as resistors 23, 24, 25 and 26 deposited or coated upon a plastic backing plate 27. These resistor elements are shown as electrically isolated from each other by means of vertical saw cuts 28 that extend through the resistance coating and into the insulating material of the backing plate 27.

The resistor control assembly and wherein the resistors are mounted, is comprised of a plurality of spring biased contact wiper arms 32, 33, 34, and 35 that are commonly mounted upon but respectively insulated, as at 36, from a metallic bracket member 39, FIG. 3, that serves as a common conductor for the resistor elements 23, 24, 25 and 26 to which they are electrically connected and secured as by rivits 40. This arrangement of the gaiting circuit resistors and controlling elements therefor, provides for a rugged, integral structural unit readily adaptable for soldering as a unit within a printed circuit board and as shown in FIG. 3 as soldered thereto at 41 and 42.

Each of the resistor wiping arms 32, 33, 34 and 35 are formed of light flexible spring stock material that includes a polished or graphite coated contact surface 45 that is maintained, by the inherent spring action of the arm, in constant bearing contact with its respective resistor surface upon board 27.

As apparent from FIG. 3, movement of the contact surface 45 across the face of the resistor 23 by rotation of cam 56, effects predetermined variations in the resistance value of the resistor 23 and as determined by the configeration of the cam and these resistor variances, as applied to the gaiting circuit within which the resistor is connected, effects preportional variations in the duty cycle output of its respective duty cycle unit and preportional light output variations in a lighting string connected therewith.

The advantages of such a control is that it provides means for coordinating the operation of a number of independent lighting sources to produce an overall lighting effect unobtainable by other forms of light controlling apparatus. Further, by proper selecting the configeration and positioning of cams 56, 57, 58, and 59, the respective light intensity paterns between lighting sources connected to the respective units, may be programmed to be overlapping in nature, as apparent by the light intensity curve paterns 61, 62, 63, and 64 as shown in FIG. 5, and whereby the varying light intensity output throughout, say a lighted Christmas tree, will remain substantially constant while a continuous shimmering effect is maintained throughout the tree.

The duty cycle unit as shown by 14, 15, 16, and 17 shall be understood to mean any suitable type of solid state assembly wherein the resistance value of the gaiting circuit resistor determines the duty cycle output of the unit. Duty cycle shall be understood to mean the ratio between the portion of the AC cycle that the unit is "on" or conducting current to the "off" time of the cycle when "no" or relatively no current is being passed. These "on" and "off" intervals occur very rapidly with the relative duration of these intervals being controlled by the design of the gait or triggering circuit to the SCR, TRIAC and DIAC or such similar electronic elements of the unit circuitry. The duty cycle or "conducting" interval of the cycle as it relates to the "off" interval, determines the relative heating and cooling time of the incondescent lamp filament and consequently the light intensity output of the lighting source.

Since the resistance valve of the gaiting circuit resistor determines the conducting interval of the unit, varying the resistance value of the gaiting circuit resistor effectively varies the duty cycle output of the unit and similiarly the light output intensity of a lighting source connected therewith.

While herein is shown a simple form of the device, it is understood that various structures and arrangements may be resorted to for producing the coordinated gaiting circuit resistance changes required of the device. Further, it is understood that while it is most desirable that the light output intensity of the lighting sources involved is never reduced below the incandescent level, a further reduction in filament heat may be resorted to without varying from the concept as herein disclosed.

What I therefore claim and desire to convey by Letters Patent is:

1. An ornamental lighting control including in combination a plurality of solid state duty cycle units having a common input and respective variable duty cycle outputs, connector means respectively connected to each duty cycle output for connecting thereto an ornamental lighting source with the duty cycle rate of said output determining the light output intensity of a lighting source connected therewith, control means for varying gradually and in a predetermined random and in respectively differing order, the duty cycle rate of each duty cycle unit whereby the light output intensity pattern of each lighting source respectively connected to each output differs from the other for a predetermined operating interval of the units.

2. An ornamental lighting control as claimed in claim 1 wherein each duty cycle unit includes an RC gating circuit with the resistance valve of the gating circuit resistor determining the duty cycle of the unit and light output intensity of a lighting source connected therewith, and wherein said control includes means for varying in gradual and predetermined random and differing order with respect to each other the resistance value of each gating circuit resistor in each R.C. circuit.

3. A lighting control as claimed in claim 1 wherein the respective duty cycle outputs of the unit of the control will never reduce the light output intensity of a lighting source connected therewith to below an incandescent state.

4. An ornamental lighting control including at least two solid state duty cycle units having a common power input and respectively variable duty cycle outputs, connector means respectively connected to each of said outputs for connecting thereto an ornamental lighting source to be controlled and wherein the duty cycle of said outputs determines the light output intensity of a lighting source connected therewith, motor means, control means movable by said motor means to effect predetermined random variations in the duty cycle of each duty cycle unit whereby the light output intensity pattern of each lighting source, respectively connected to each duty cycle unit, differs from each of the others for a predetermined operating interval of said control means.

5. An ornamental lighting control as claimed in claim 4 wherein each duty cycle unit includes an RC gating circuit with the resistance value of the gating circuit resistor in each duty cycle unit determining the duty cycle of the unit and the duty cycle of the output connected therewith and wherein the means movable by said motor means operates to randomly vary in predetermined gradual and differing order, the resistance value of each gating circuit resistor in each of the said duty cycle units.

6. A control as claimed in claim 4 wherein the light intensity output of a lighting source connected to a duty cycle output of the control is never reduced below an incandescent state.

7. An ornamental lighting control including at least four duty cycle units haivng a common input and respectively variable duty cycle outputs, connector means respectively connected to each said duty cycle output for connecting thereto a lighting source to be controlled with the duty cycle of each output determining the light output intensity of a lighting source connected therewith, control for varying in gradual and predetermined random and differing order with respect to each other the duty cycle of each output to produce random variations in the light output intensities of each lighting source respectively connected to each output.

8. An ornamental lighting control as claimed in claim 7 wherein no duty cycle output of any unit shall reduce the light output intensity of a lighting source connected therewith by greater than 80 percent from full brightness.

9. A control as claimed in claim 7 wherein the light intensity of an incandescent lighting source, connected to the duty cycle output of the control, is never reduced below an incandescent state.

* * * * *

UNITED STATES PATENT OFFICE
CERTIFICATE OF CORRECTION

Patent No. 4,057,735 Dated Nov. 8, 1977

Inventor(s) George B. Davis Jr.

It is certified that error appears in the above-identified patent and that said Letters Patent are hereby corrected as shown below:

In Claim 7 , line 8 between "control" and "for" , insert --means--.

Signed and Sealed this

***Fourteenth* Day of *November 1978***

[SEAL]

*Attest:*

RUTH C. MASON
*Attesting Officer*

DONALD W. BANNER
*Commissioner of Patents and Trademarks*